United States Patent
Daitoku et al.

[15] 3,643,576
[45] Feb. 22, 1972

[54] CAMERA CAPABLE OF COMBINATION WITH A POWER-DRIVEN HOUSING FOR FILM-REWINDING

[72] Inventors: Kouichi Daitoku; Shuji Kimura, both of Tokyo, Japan

[73] Assignee: Nippon Kogaku K.K., Tokyo, Japan

[22] Filed: Dec. 4, 1970

[21] Appl. No.: 95,147

[30] Foreign Application Priority Data

Dec. 12, 1969 Japan..................................44/117539
Dec. 12, 1969 Japan..................................44/117540

[52] U.S. Cl. ........................................................95/31 EL
[51] Int. Cl. .......................................................G03b 19/04
[58] Field of Search...........................95/31 R, 31 EL, 31 CA

[56] References Cited

UNITED STATES PATENTS

| | | | |
|---|---|---|---|
| 3,119,315 | 1/1964 | Lange et al. | 95/31 EL |
| 3,448,669 | 6/1969 | Minoru Suzuki | 95/31 EL |
| R26,181 | 4/1967 | Harvey et al. | 95/31 EL UX |

FOREIGN PATENTS OR APPLICATIONS 1,247,840    8/1967    Germany..............................95/31 EL

*Primary Examiner*—Joseph F. Peters, Jr.
*Attorney*—Ward, McElhannon, Brooks & Fitzpatrick

[57] ABSTRACT

A camera of the type which uses a magazine provided with a supply spool having the opposite ends thereof exposed out of the shell of the magazine, a slit for passing a film therethrough and capable of being opened and closed, and a slit-operating means for opening and closing the slit provided in one end face of the magazine. The camera includes an aperture formed below a film magazine containing chamber, and a light-intercepting cover for covering the aperture to prevent the entry of any extraneous light therethrough while enabling the opening and closing of the camera's backplate and the slit of the film magazine, whereby power-driven film-rewinding operation can be accomplished by replacing the light-intercepting cover with power-driven film-rewinding means, and the camera's backplate and the slit of the film magazine can be opened and closed with the power-driven film-rewinding means mounted on the camera. The camera may further include a retaining member for retaining the light-intercepting cover so as to inhibit the removal of such cover unless the camera's backplate is opened, and a release member for releasing the light-intercepting cover from its retained position provided in the film magazine containing chamber.

7 Claims, 8 Drawing Figures

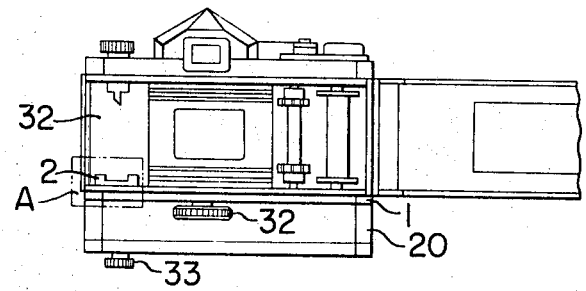
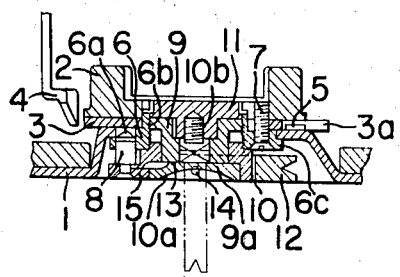
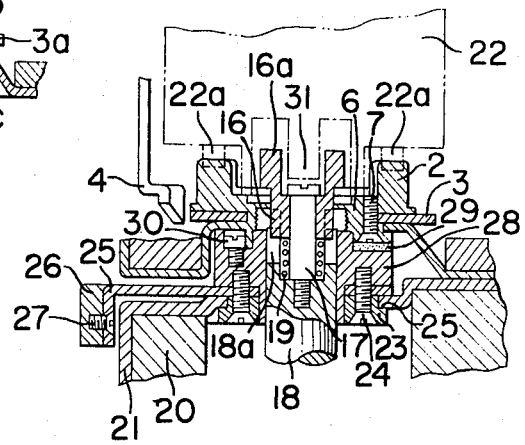
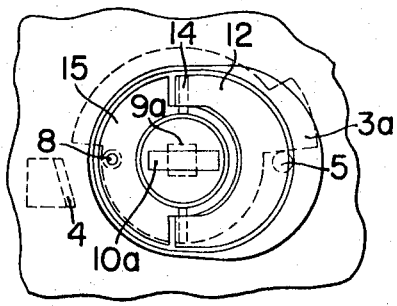

CAMERA CAPABLE OF COMBINATION WITH A POWER-DRIVEN HOUSING FOR FILM-REWINDING

BACKGROUND OF THE INVENTION

1. Field of the Invention

This invention relates to a camera, and more particularly to a mechanism provided for mounting power-driven film-rewinding means below a film magazine containing chamber in a camera.

2. Description of the Prior Art

Cameras have been in the tendency to contain therein power-driven film-rewinding means as a result of the automation of the rewind and shutter-release operations. In view of such a tendency in the art, there is a strong need to provide power-driven film-rewinding means which may be detachably mounted on cameras containing no such rewinding means to thereby achieve the same performance as those cameras which have self-contained power-driven film-rewinding means.

SUMMARY OF THE INVENTION

It is a first object of the present invention to provide, in a camera of the type in which the film inlet and outlet slit of a film magazine may be opened and closed in response to the opening-closing of the camera's backplate effected by a backplate opening-closing pawl, an aperture formed below a film magazine containing chamber in the camera, and a light-intercepting cover for covering the aperture to prevent the entry of any extraneous light therethrough while enabling the opening and closing of the camera's backplate and the film inlet and outlet slit of the film magazine, whereby power-driven film-rewinding operation can be accomplished by removing the light-intercepting cover and inserting a power-driven rewinding shaft of power-driven film-rewinding means into that aperture and the opening-closing of the camera's backplate and the film inlet and outlet slit of the film magazine can be effected with the power-driven film-rewinding means mounted on the camera.

It is a second object of the present invention to provide, in the camera of the described type, a retaining member for retaining the light-intercepting cover so as to inhibit the removal of such cover unless the camera's backplate is opened, and a release member for releasing the light-intercepting cover from its retained position provided in the film magazine containing chamber.

These and other features of the present invention will be fully apparent from the following detailed description of embodiments thereof when taken in conjunction with the accompanying drawings.

BRIEF DESCRIPTION OF THE DRAWINGS

FIG. 1 is a rear view of a camera according to a first embodiment of the present invention and showing the camera with its backplate being opened.

FIG. 2 is a vertical cross-sectional view showing the portion A of FIG. 1, i.e., the mechanism located below the film magazine containing chamber of the camera.

FIG. 3 is a view taken along line III of FIG. 2.

FIG. 4 is a vertical cross-sectional view showing the portion A of FIG. 1 and power-driven rewinding means combined together.

DESCRIPTION OF THE PREFERRED EMBODIMENTS

Figure 5:
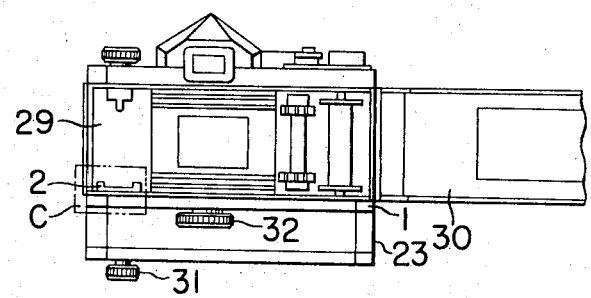
FIG. 5 is a rear view showing the appearance of a camera according to a second embodiment of the present invention, with its backplate being opened.

Referring to FIGS. 1 to 4, there is shown a camera according to a first embodiment of the present invention in which a bottom plate 1 is secured to the body of the camera. A film magazine receiver 2 has two projections formed circumferentially thereof. The construction of the embodiment is such that rotation of the film magazine receiver 2 causes film inlet and outlet pins 22a extending from a film magazine 22 to be engaged with the projections of the film magazine receiver 2 to thereby open and close a film inlet and outlet slit formed in the film magazine. A cam for the camera's backplate is rotatable with the magazine receiver 2 and has a projection 3a adapted to raise a key lever 4 of the camera's backplate to thereby unlatch the key so as to open and close the backplate. A pin 5 secured to the camera's bottom plate 1 limits the rotation of the backplate cam 3. A coupling ring 6 is connected to the magazine receiver 2 and the cam 3 by means of a screw 7 so that rotation imparted to the coupling ring 6 by a pin 8 received in a coupling hole 6a may be transmitted to the magazine receiver 2 and the cam 3. Thus, it will be seen that the magazine receiver 2, backplate cam 3, coupling ring 6 and screw 7 together provide an aperture in the camera body as well as a group of opening-closing members in the camera body for opening and closing the camera's backplate and the film inlet and outlet slit in the magazine 22. The coupling ring 6 has an internally threaded hole 6b so that an externally threaded ring 9 having a square hole 9a may be screwed into the internally threaded hole 6b by the rotational force imparted from a rotary shaft 10 through the channel 10a thereof to the ring 9 having its square hole 9a engaged with the shaft 10. A blind nut 11 for preventing the slipping-out of the threaded ring 9 is screwed to the threaded portion 10b of the rotary shaft 10 so that the threaded ring 9 and the blind nut 11 are rotatable with the rotary shaft 10. The outer sidewall 6c of the coupling ring 6 is in engagement with the camera's bottom plate 1 so as to provide a bearing. A pawl 12 for the camera's backplate is pivotally mounted so that it may be cocked and rotated against the force of a click plate spring 13 to thereby rotate a camera's backplate opening-closing plate 15 by means of a pin 14. The plate 15 has a pin 8 studded therein so as to stop the click plate spring 13 and transmit a rotational force to the coupling ring 6. The backplate opening-closing plate 15 engages the threaded ring 9 in such a manner that when the threaded ring 9 is screwed into the coupling ring 6 the engagement of the pin 8 with the coupling hole 6a of the coupling ring 6 occurs earlier than the engagement of the ring 9 with the coupling ring 6 so as to determine the relative position between the ring 9 and the coupling ring 6. The backplate opening-closing plate 15 is also vertically slidable with respect to the threaded ring 9. Thus, the threaded ring 9, rotary shaft 10 and blind nut 11 together constitute a light-intercepting cover for completely intercepting the light incident on the aperture defined below the magazine containing chamber by the inner walls of magazine receiver 2, backplate cam 3 and coupling ring 6. Also, the backplate pawl 12, click plate spring 13, pin 14, backplate opening-closing plate 15 and pin 8 together constitute a group of opening-closing members in the light-intercepting cover for opening and closing the camera's backplate and the film inlet and outlet slits upon rotation of the backplate pawl 12.

Description will now be made of the manner in which power-driven film-rewinding means is mounted on the camera. The threaded ring 9 is rotated in the opposite direction with the aid of the rotary shaft 10 so that the light-intercepting cover 9–11 and the group of opening-closing members 8, 12–15 are removed together. The magazine receiver 2, backplate cam 3, backplate key lever 4, pin 5, coupling ring 6 and screw 7 remain on the camera's bottom plate, thus providing an aperture available for receiving the power-driven rewinding shaft 18 of power-driven film-rewinding means (FIG. 4). The body 20 of the power-driven film-rewinding means is then mounted on the camera by the use of a tripod screw 32, as shown in FIG. 4. A coupling pawl 16 engages a projection 31 extending from the spool of film magazine 22, and the rotation of the power-driven rewinding shaft 18 is transmitted to the coupling pawl 16 through the engagement between a groove 18c and a projection 16a. To facilitate the engagement between the coupling pawl 16 and the spool projection 31, the coupling pawl 16 is vertically slidable along the recessed surface of the power-driven rewinding shaft 18 and a coupling pawl keep screw 17 against the force of a spring 19. The power-driven rewinding shaft 18 is connected to an unshown motor. Between the power-driven shaft 18 and the unshown motor, there may be provided a clutch mechanism so that the drive of the motor may be transmitted to the shaft 18 but that the rotation of the film magazine during the film-rewinding operation may not be transmitted to the motor. The power-driven rewinding shaft 18 may be lowered, if desired, so that the coupling pawl 16 can escape from the film magazine 22 to enable the latter to be removed from the camera. Thus, the power-driven rewinding shaft 18 is axially slidably engaged with an interlocking ring 28 for opening and closing the camera's backplate. The body 20 of the power-driven film-rewinding means has an apertured housing 21 secured thereto, and a backplate opening-closing seat 23, a rotatable lever 25 and the interlocking ring 28 connected together by means of screws 24 are rotatably mounted to the body 20. One end of the rotatable lever 25 protrudes beyond the camera body and the body 20 of the power-driven film-rewinding means so that such end of the lever 25 may be manually turned to thereby rotate the interlocking ring 28. A knob 26 shaped for facilitating its manual operation is secured to the rotatable lever 25 by means of a screw 27. The interlocking ring 28 has a pin 30 screwed therein and is coupled to the coupling ring 6 to transmit the rotational force to the latter. A light-intercepting material 29 may be provided on the ring 28 to prevent the entry of light. The members 23 to 30 together constitute an operating member for opening and closing the camera's backplate and the film inlet and outlet slit in the film magazine, and this operating member is coupled to the aperture portion constituted by the film magazine receiver 2, backplate cam 3 and coupling ring 6.

With such an arrangement, the spool projection 31 of the film magazine can engage the coupling pawl 16 of the power-driven rewinding shaft 18 to enable the power-driven film-rewinding and the rotation of the rotatable lever 25 can be transmitted to the coupling ring 6 to enable the opening-closing of the film inlet and outlet slit in the film magazine as well as of the camera's backplate.

The mounting mechanism for the power-driven film-rewinding means thus provided below the magazine containing chamber of the camera achieves substantially the same function of opening and closing the film inlet and outlet slit and the camera's backplate, both for the ordinary manual rewinding operation using the backplate pawl 12 and for the power-driven rewinding operation using the rotatable lever 25 of the power-driven film-rewinding means.

Figure 6:
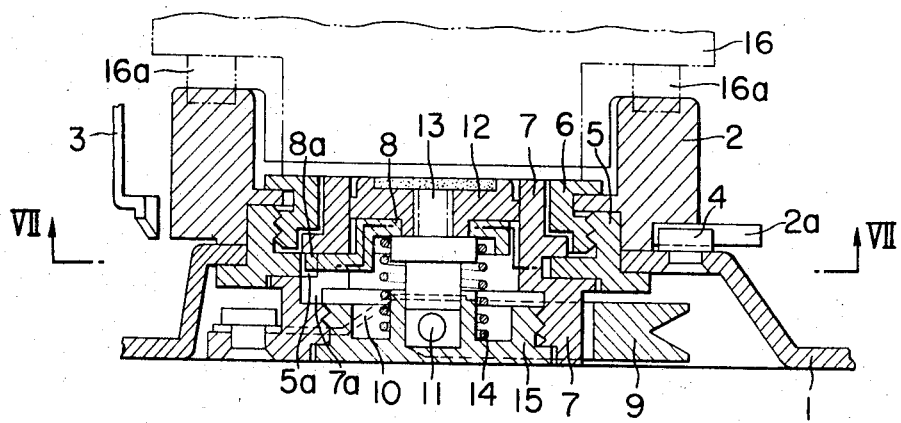
FIG. 6 is an enlarged, vertical cross-sectional view showing the portion C of FIG. 5, i.e., the portion underlying the film magazine containing chamber.
Figure 7:
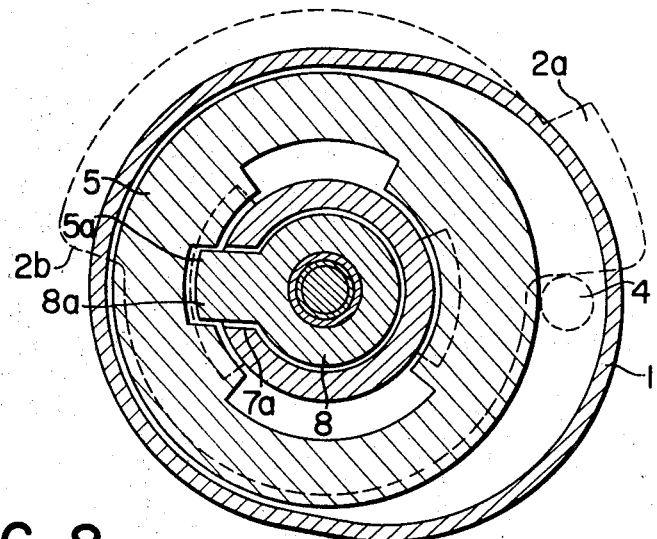
FIG. 7 is a horizontal cross-sectional view taken along lines VII—VII of FIG. 6.

Referring now to FIGS. 5, 6 and 7, there is shown another embodiment of the present invention in which the camera body has a bottom plate 1 secured thereto. A film magazine receiver 2 has two projections formed circumferentially thereof. The arrangement of this embodiment is such that when the film magazine receiver 2 is rotated an unshown aperture in a film magazine 16 is closed by pins 16a formed in a film magazine 16 and the circumferential projections 2a upwardly displaces a key lever 3 for locking a backplate 30 of the camera, thereby releasing the backplate from the locking of the key lever 3. A recess 2b is formed in the film magazine receiver 2 to limit the rotation thereof (FIG. 7). A limit pin 4 is secured to the bottom plate 1 of the camera, and this pin 4 cooperates with the projection 2a and the recess 2b to determine the angle of rotation of the film magazine receiver 2. An outer or female bayonet 5 is mounted together with the film magazine receiver 2, by means of a nut 6, with the bottom plate 1 interposed therebetween. The bayonet 5 is rotatable with respect to the bottom plate 1 within the limit of rotation provided by the recess 2b. The outer bayonet 5 also has a recess 5a formed in the lower inner wall thereof and engageable with a projection 8a formed in a lock lever 8. The bottom plate 1, the film magazine receiver 2, the outer bayonet 5 and the nut 6 are always attached to the camera body. The inner walls of the outer bayonet 5 and nut 6 define an opening extending from a film magazine containing chamber 29 to the exterior of the camera body. An inner or male bayonet 7 is inserted into the outer or female bayonet 5 and into the film magazine receiver 2 so as to establish a bayonet-coupling with the outer bayonet 5.

As shown in FIG. 7, the inner bayonet 7 has a cutaway 7a formed partly axially thereof so as to receive therein the projection 8a of the lock lever 8 coaxial with a pushbutton 12, which will be described later, and permit the axial displacement of the lock lever 8. The lock lever 8 provides a retainer member in the sense that the projection 8a thereof engages the recess 5a of the outer bayonet 5 to stop the rotation of the inner bayonet 7 and accordingly the relative rotation between the inner and outer bayonets, thus preventing the removal of a light-intercepting cover. A pawl 9 for opening and closing the backplate of the camera is pivotally connected to the inner bayonet 7 by means of a pin 11 and it is held in operative and film magazine containing positions by the force of a click plate spring 10. The pushbutton 12 is coaxial and slidable with respect to the inner wall of the inner bayonet 7 and has a coaxial slide shaft 13 fitted therein with the lock lever 8 interposed between the inner bayonet 7 and the pushbutton 12. The pushbutton 12 is of such construction that it is biased upwardly by a coil spring 14 so as to maintain the projection 8a of the lock lever 8 in engagement with the upper end of the cutaway 7a formed in the bayonet 7, and that if the pushbutton 12 is depressed downwardly with respect to the film magazine containing chamber 29 against the force of the coil spring 14, the projection 8c of the lock lever 8 is disengaged from the recess 5a of the outer bayonet 5 to allow the rotation of the inner bayonet 7. It will thus be noted that the pushbutton 12 provides a release member for releasing the retention of the aforesaid retainer member, i.e., the lock lever 8. The coil spring 14 is secured at the lower end thereof to a spring receiver 15 screwed into the inner bayonet 7. Thus, a detachable light-intercepting cover is provided by the described arrangement of inner bayonet 7, lock lever 8, pawl 9 for opening and closing the backplate of the camera, click plate spring 10, pin 11, pushbutton 12, slide shaft 13, coil spring 14 and spring receiver 15.

With the light-intercepting cover attached to the camera body as shown in FIGS. 6 and 7, the pawl 9 for opening and closing the backplate of the camera may be cocked and rotated into operative position against the force of the click plate spring 10, so that the film magazine receiver 2 is rotated through the pin 11, inner bayonet 7, cutaway 7a, projection 8a of lock lever 8, recess 5a and outer bayonet 5. Thus, the rotation of the film magazine receiver 2 results in the opening or closing of the aperture in the film magazine 16 and the retention or release of the backplate of the camera. In that case, the outer and inner bayonets 5 and 7 are rotated together by means of the projection 8a of the lock lever 8.

To open the light-intercepting cover in order to insert the power-driven rewinding shaft 20 of the power-driven rewinding means, the pawl 9 is cocked and rotated into a position for releasing the camera's backplate in the described manner, to thereby open the backplate. Then the pushbutton 12 is pushed against the bias of the coil spring 14 to release the engagement between the projection 8a of the lock lever 8 and the recess 5a of the outer bayonet 5.

Subsequently, when the pawl 9 is further rotated in the direction for releasing the retention, the outer bayonet 5 is no longer rotatable with the recess 2b of the film magazine receiver 2 restrained by the limit pin 4 while the inner bayonet 7 is rotated to release its bayonet-coupling with the outer bayonet 5. Thus, the light-intercepting cover can now be opened.

To close the light-intercepting cover, the pushbutton 12 is pushed and rotated in the direction opposite to the direction of rotation previously described for opening that cover. The inner bayonet 7 is rotated with the outer bayonet 5 until the latter's rotation is stopped by the limit pin 4 to thereby establish a bayonet-coupling between the two bayonets. At this point of time, when the pushbutton 12 is released, the coil spring 14 displaces the pushbutton 12, lock lever 8 and slide shaft 13 so that the projection 8a of the lock lever 8 engages the recess 5a of the outer bayonet 5 to retain the outer and inner bayonets 5 and 7 in engagement with each other. Thus, the light-intercepting cover is closed.

Figure 8:
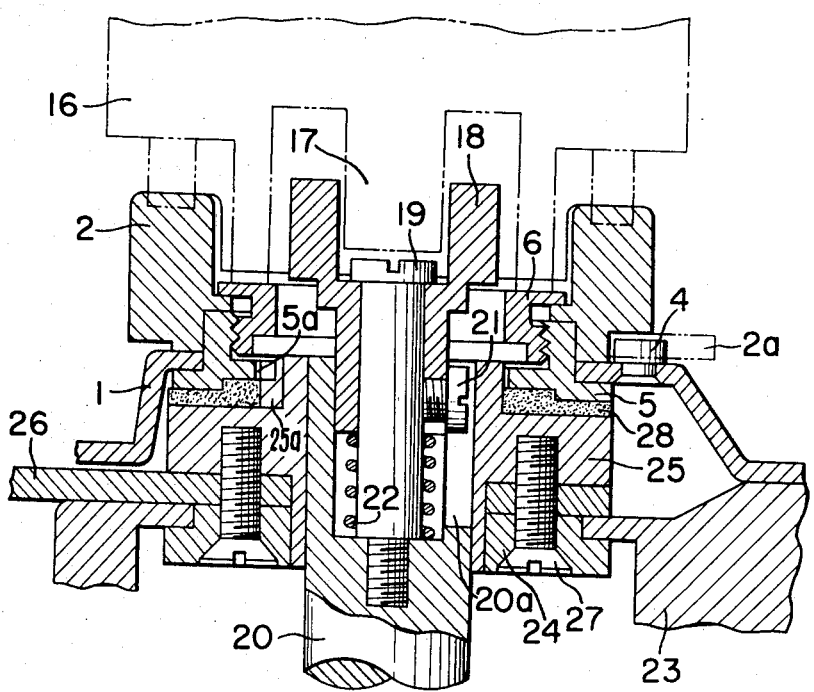
FIG. 8 is an enlarged, vertical cross-sectional view showing the portion C of FIG. 5 with the power-driven film-rewinding means attached thereto.

Description will now be made of the case where the power-driven film-rewinding means has been mounted on the camera by means of a tripod screw 32 (FIG. 5). Referring to FIG. 8, the power-driven rewinding shaft 20 of the power driven rewinding means is shown coupled to the aperture in the film magazine containing chamber. As shown, a film magazine 16 is of the type which has a projection 17 formed at one end of the spool shaft. The projection 17 is engaged by one end of a coupling 18 which transmits its rotation to the spool shaft of the film magazine 16. A slide shaft 19 is inserted through the other end of the coupling 18, which end is received in the power-driven rewinding shaft 20 as will be described, and engaged in a groove 20a formed axially of power-driven rewinding shaft 20, by means of a screw 21 threaded into the lower sidewall of the coupling 18. The coupling 18 is connected to the power-driven rewinding shaft 20 by means of an upwardly biasing coil spring 22 so that the coupling is axially slidable along the slide shaft 19 by the force of the coil spring while being rotatable with the power-driven rewinding shaft 20. The upward movement of the coupling 18 is limited by the enlarged top of the slide shaft 19. The axially slidable arrangement of the coupling 18 is intended to readily permit the engagement between the coupling 18 and the spool shaft projection 17 of the film magazine 16. The power-driven film-rewinding means 20 is connected to an unshown motor and fitted for rotation and axial movement within an interlocking ring 25 for opening and closing the camera's backplate. The ring 25 has a projection 25a of a reduced diameter formed at one end thereof and engaging the recess 5a of the outer bayonet 5 so as to maintain the pawl 9 and an operating lever 26 in a similar position. A seat 24 for opening and closing the camera's backplate is secured, together with the operating lever 26, to the ring 25 by means of screws 27 in such a manner that the members 24, 25 and 26 are all rotatable with respect to the body 23 of the power-driven rewinding means. The operating lever 26 is projected outwardly of the power-driven rewinding means and rotatable between the position for releasing the camera's plate and the position for retaining the same plate. A light-intercepting material 28 is provided between the ring 25 and the outer bayonet 5 to prevent the entry of any extraneous light through the aperture. The parts indicated by the other reference numerals in FIG. 8 are the same as those appearing in FIG. 6.

With this arrangement, the operating lever 26 may be rotated to the position for releasing the camera's backplate or to the position for retaining the same plate, to thereby rotate the outer or female bayonet 5 whose recess 5a is engaged by the projection 25a of the ring 25. Thus, the film magazine receiver 2 with its projection 2a is rotated so that the opening and closing of the aperture of the film magazine 16 and the release and retaining of the camera's backplate are accomplished in the same way as described with respect to FIG. 6.

To effect the power-driven rewinding operation, the power-driven rewinding shaft 20 is pressed inwardly with the operating lever 26 maintained in the retaining position and then the power-driven rewinding means is actuated to rotate the power-driven rewinding shaft 20, whereby the coupling 18 automatically engages the spool wall projection 17 to rewind the film into to permit film magazine 16.

To effect the ordinary film-winding operation, the power-driven rewinding shaft 20 may be moved down by manually grasping a knob 31 to thereby release the engagement between the coupling 18 and the projection 17 (FIGS. 5 and 8), or alternatively a clutch mechanism may be provided between the unshown motor and the power-driven rewinding shaft 20 so that no load may be imparted during the winding operation. In order to detach the power-driven rewinding shaft 20 of the power-driven rewinding means, the operating lever 26 may be rotated to the position for releasing the camera's backplate and then the outer bayonet 5 is also brought into similar position as described with respect to FIG. 6. This is also the case with the mounting of the power-driven rewinding means.

As will be appreciated from the foregoing, rotating the backplate opening-closing pawl provided below the film magazine containing chamber is a recommendable way to open the backplate of a camera and the film inlet and outlet slit formed in a film magazine. This is because, in order to avoid the possible exposition of the film to light and the possible friction between the magazine and the film, the existing film magazines are generally of such construction that rewinding operation must take place always after the film inlet and outlet slit in the inner cylinder of the magazine has been rotated about 180° with respect to the film inlet and outlet slit in the outer cylinder of the magazine. Thus, the simplest and most reliable way to ensure the opening and closing of the film inlet and outlet slit of the film magazine is to provide the same angle of rotation directly below the film magazine. It is also required that the camera's backplate cannot be opened inadvertently, and such requirement can be readily met by the aforesaid method of opening-closing the backplate using the 180° rotation of the backplate opening-closing pawl, wherein a great amount of motion involved in cocking the backplate opening-closing pawl serves as means for safety. Thus, a high degree of safety and reliability in performance can be attained whether the camera is used with or without the power-driven film-rewinding means mounted thereon.

Further, according particularly to the second embodiment of the present invention, the light-intercepting cover fitted in the aperture extending from the film magazine containing chamber into the exterior of the camera body cannot be opened unless the camera's backplate is opened, and thus such a trouble can never occur that the light-intercepting cover is inadvertently removed from the camera body during the photographing operation to thereby fatally expose the film in the camera to the extraneous light. Also, a higher degree of safety against the extraneous light can be attained by the present invention when combined with camera's backplate provided with a backplate releasing-retaining mechanism to prevent any inadvertent opening of the backplate as disclosed in the second embodiment.

What is claimed is:

1. A camera using a magazine provided with a supply spool having the opposite ends thereof exposed out of the shell of the magazine, a slit for passing a film therethrough and capable of being opened and closed, and a slit-operating means for opening and closing said slit provided in one end face of the magazine, the combination comprising:
 a film housing for containing said magazine therein;
 a first driving member disposed in said film housing and manually operable to rotate said spool for film rewinding;
 a control member disposed in said film housing and having an engaging portion engageable with said slit-operating means, said control member being movable so as to provide said slit-operating means with a motion necessary to open and close said slit, said control member having an aperture formed in a portion thereof on the extension of the axis of said spool; and
 a covering member for opening and closing said aperture of said control member and capable of completely intercepting any light incident on said aperture when said aperture is closed, said covering member including a first clutch means engageable with said control member when said aperture is closed, said first clutch means being capable of providing said control member with a motion necessary to drive said slit-operating means through a manual actuation imparted from the exterior of said camera housing.

2. A camera as defined in claim 1, wherein the combination further comprises a power-driven housing which may be detachably mounted on said camera and when mounted on said camera, can completely intercept any light incident on said aperture of said control member, said power-driven housing including:
- a second driving member engageable and disengageable with said spool end having said slit-operating means when said power-driven housing is mounted on said camera, said second driving member being capable of rotating said spool with a motive power during power-driven film rewinding; and
- a second clutch means engageable with said control member when said power-driven housing is mounted on said camera, and capable of providing said control member with a motion necessary to drive said slit-operating means through a manual actuation imparted from the exterior of said power-driven housing.

3. A camera as defined in claim 1, wherein the combination further comprises a deformable intercepting member having a central opening dimensioned sufficiently to provide said aperture of said control member, said intercepting member being interposed between said control member and said covering member when said camera is used without said power-driven housing combined therewith, said intercepting member being interposed between said control member and said power-driven member when said camera is used with said power-driven housing combined therewith.

4. A camera as defined in claim 1, wherein the combination further comprises a first locking means capable of blocking the opening action of said covering member independently of its own closing action, and a releasing means capable of releasing said blocking action of said first locking means with respect to said covering member, said releasing means being manually operated only within said film housing.

5. A camera as defined in claim 1, wherein said film housing has a wall portion which can be opened and closed to permit the loading and unloading of said magazine, and said camera further includes a second locking means disposed in said film housing and capable of locking said wall of said film housing in closed position, said second locking means being displaceable to a position for opening said wall of said film housing in response to the movement of said control member.

6. A camera as defined in claim 2, wherein said second driving member is movable along its own axis with respect to said power-driven housing when engaging said spool.

7. A camera as defined in claim 4, wherein said releasing means is disposed in said covering member.

* * * * *